UNITED STATES PATENT OFFICE.

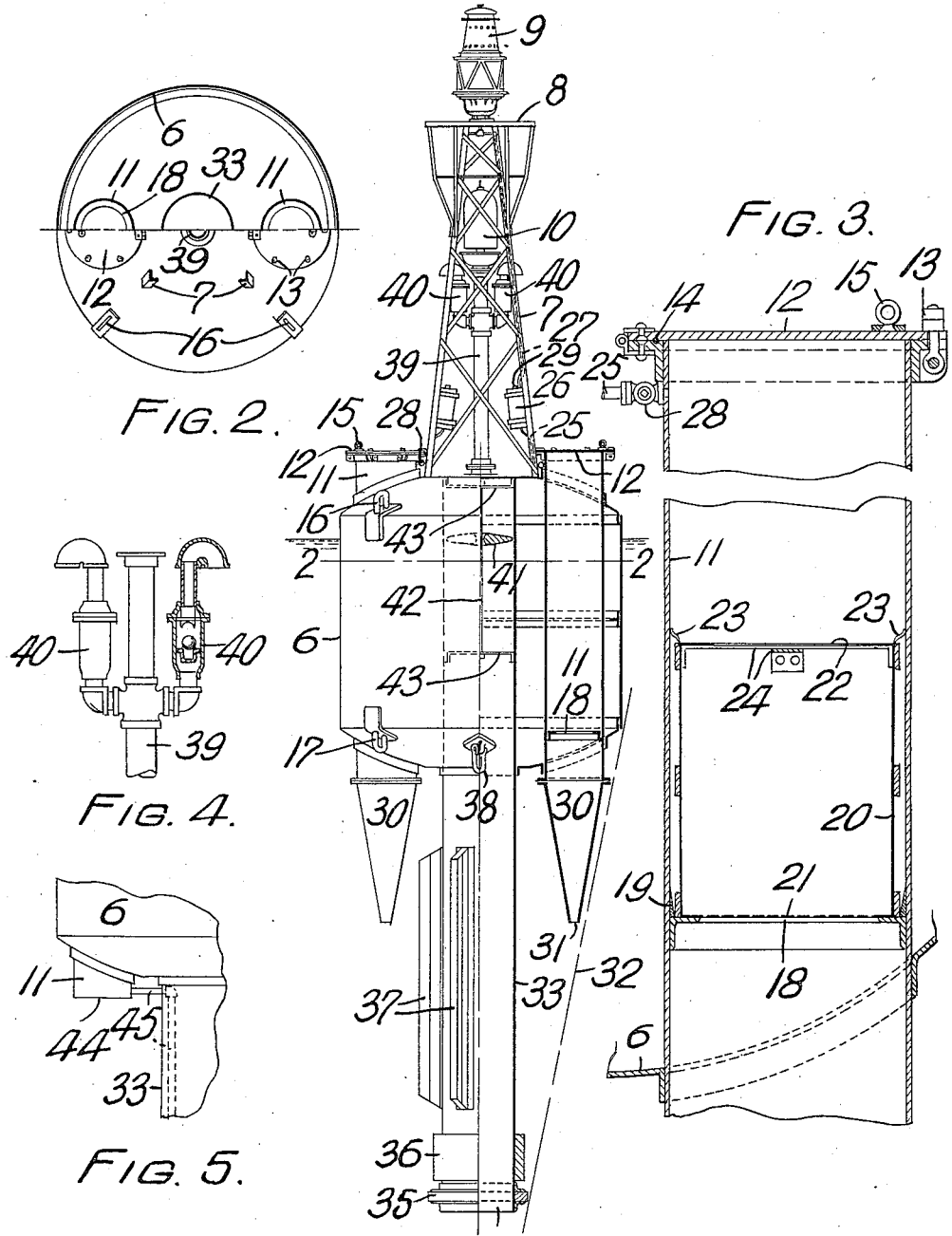

PETER C. JOHNSON AND JOSEPH A. LEGERE, OF HALIFAX, NOVA SCOTIA, CANADA.

COMBINED GAS AND WHISTLING BUOY.

1,050,947.  Specification of Letters Patent.  Patented Jan. 21, 1913.

Application filed August 21, 1911. Serial No. 645,199.

*To all whom it may concern:*

Be it known that we, PETER C. JOHNSON and JOSEPH A. LEGERE, both of the city of Halifax, Province of Nova Scotia, and Dominion of Canada, have invented certain new and useful Improvements in Combined Gas and Whistling Buoys, of which the following is a full, clear, and exact description.

This invention relates to improvements in lighting and whistling buoys for navigation purposes, and the main object is to provide an efficient and complete buoy. A subsidiary object is to provide a buoy which will require a minimum of care and which may be easily charged while on its station and may be handled on land with great facility.

This invention is directed to that type of buoy in which the light is supplied with acetylene gas generated within the buoy, while the whistle is operated by air drawn in and expelled by the rise and fall of the buoy in water.

To accomplish the above objects, a cylindrical body or float is provided carrying a superstructure supporting the light and whistle. Gas generating chambers are located in such position within the body that they may be readily charged while the buoy is on its station. A long air tube passes centrally through the body and depends some distance therebelow. The bottom of this tube is preferably weighted to act as a keel, and maintain the buoy in upright position. Carbid cans having perforated bottoms are located within the generating chambers, and suitable means are provided to admit water to the carbid.

In the drawings which illustrate this invention:—Figure 1 shows on the left an elevation, and on the right, a vertical section through the center of the buoy. Fig. 2 shows at the top a section of the buoy on the line 2—2, Fig. 1, and at the bottom, a plan of the buoy, the superstructure being removed. Fig. 3 is an enlarged vertical section of one of the generating chambers. Fig. 4 is an enlarged detail of the whistle air valves. Fig. 5 is a fragmentary view showing an alternative method of admitting water to the generating chambers.

Referring to the drawings, 6 designates a cylindrical body or float, closed at top and bottom, and carrying a suitably latticed pyramidal superstructure 7 at the top of which is a small platform or gallery 8, on which the lamp 9 is mounted. Within the superstructure is a large whistle 10. Passing vertically through the body are a pair of cylindrical gas generating chambers 11, provided with hinged covers 12 secured by suitable bolts 13 and rendered gas tight by means of gaskets 14. Each cover is provided with a lifting eye 15. For convenience in charging the buoy while on its station, the chambers 11 are arranged on diametrically opposite sides of the buoy, as shown in Fig. 2. To faciliate this operation, eyes 16 are provided, two at the top, on one side of the buoy, and also two corresponding eyes 17 at the bottom for lifting the buoy out of the water. Near the bottom of each generating chamber is an internal flange 18, which supports the carbid cans and also a beveled band 19 which centers the bottom can. The carbid cans 20, preferably three for each chamber, are constructed as shown in Fig. 3, with a perforated bottom 21 and open top 22, carrying at the outer edge a gasket 23, which engages the wall of the chamber and prevents a sudden rush of water. The top of each can is provided with a pair of crossed lifting bands 24. Gas generated in the chambers 11 passes through pipes 25 to purifiers 26, located in the superstructure, and from the purifiers, through pipes 27 to the lamp 9. A valve 28 is located in each pipe 25 close to the generating chamber, and each purifier is provided with a plug 29 which may be removed to allow the escape of air, after the buoy has been moored in place. Below the body, each generating chamber is reduced in the form of a cone 30, having a small opening 31 at the apex or bottom. This portion of the generating chamber is carried down in order to get sufficient water pressure to make a reliable seal. The tapering serves the double purpose of keeping these chambers out of the way when the buoy is on land, as indicated by the line 32, Fig. 1, and reducing the diameter of the water inlet 31, to prevent an inrush of water as the buoy pitches during rough weather.

Starting at the top of the body and passing downwardly through the bottom thereof is a large tube 33 having an open bottom 34. Near the bottom of the tube is a chafing ring 35, and if necessary, a sinker 36 to maintain the buoy vertical in the water. The depending portion of the air tube is protected by chafing blocks 37. For mooring the device, one or more shackles 38 are attached to the bottom of the body. Opening from the air tube 33, through the top of the body, is an air pipe 39 which connects with the whistle 10. Branching off from the pipe 39, immediately below the whistle are a pair of valves 40, through which air is drawn in, as the buoy rises with the motion of the waves. As the buoy sinks, the air is forced out of the tube 33 through the whistle. To prevent water from splashing up the air tube into the pipe 39, and freezing in cold weather, a float 41 is provided traveling on a rod 42 held at top and bottom by cross bars or spiders 43.

In the alternative form shown in Fig. 5, the conical lower portion of the generating chambers is omitted, and the bottom closed by a plate 44. Water is admitted through a pipe 45 which extends downwardly within the air tube 33 to any desired depth. Should the water seal become broken and gas escape, it will rise to the top of the tube and be blown out through the whistle.

In operation, the charged buoy is lowered over the vessel's side in vertical position, and connected to its mooring either before or after being placed in the water. The plugs 29 are then removed from the purifiers to permit the escape of air, and allow the water to rise to the carbid. When the air has escaped, the plugs are replaced and the lantern lighted. The pressure of gas in the generating chambers allows the water to rise only as needed, while the small water inlet prevents a rush of water in rough weather. When the carbid charge becomes exhausted, the buoy is simply raised a sufficient height alongside the vessel, and the generating chambers opened. The cans of used carbid or sludge are readily lifted out by means of the bars 24, and filled cans inserted in their place. Dampness in the walls of the generating chambers will not be in the least dangerous, as the carbid is protected by the dry cans in which it is loaded. The chambers are closed, the buoy lowered to position and the air blown out. The two generating chambers, each having a separate purifier and piping to the lantern, will insure the reliability of the buoy, since should one generator become ineffective, the other will be sufficient to supply the lantern. As the buoy rises and falls with the wash of the water, air is drawn in through the valves 40 and blown out through the whistle, consequently, the rougher the weather, the more continuous and loud the signal. The generating chambers are placed at the outside of the buoy so that they may be readily opened, cleared and refilled without taking off the superstructure. The conical ends of the chambers are a great practical advantage, as they allow the buoy to be very easily handled or rolled about for cleaning or painting.

It is to be noted that no provision has been made for the escape of sludge as the carbid is used. The reason for this is that it is intended to retain as much of the sludge as possible in the chambers since the same acts as a check against sudden inrushes of water. These inrushes of water coming in contact with the carbid cause the formation of much superfluous gas which either blows out at the bottom of the chambers and is lost or, if retained in the buoy, may do serious damage to the same. The gaskets at the tops of the carbid cans engage the walls of the generating chambers and prevent fine sludge from running down between the cans and the walls of the chambers, thus keeping the chambers entirely free from sludge, except in the conical lower portions where it is washed away by the water.

In many types of buoys the carbid is dropped directly into the generating chambers which necessitates periodical removal to some port in order to clean it out. The sludge frequently becomes caked so hard that several days are required to remove it, and it often happens that lumps of live carbid are imprisoned in the sludge and in cleaning out the same the live carbid becomes dislodged and upon coming in contact with water, gas is generated in large quantities. If this gas should be ignited very serious and fatal accidents might occur, and have occurred. Even if no explosion occurs a man working alone might very easily be asphyxiated before he could get out of the buoy. In the present invention the generating chambers may be much more easily and quickly cleaned and without danger. Furthermore, in certain types of buoys the generating chamber is located under the superstructure, thus making it necessary to take the buoy aboard a vessel and remove the superstructure in order to clean and fill the chamber. By means of our device the generating chambers may be cleaned and filled without removing the buoy from its moorings or hoisting aboard a vessel.

Having thus described our invention, we declare that what we claim, is:—

1. A buoy of the character described comprising a body, cylindrical chambers passing through said body having tapering lower portions open at the apex, and a plurality of carbid containers in said chambers having perforated bottoms.

2. A buoy of the character described comprising a body, a superstructure thereon, a lantern on said superstructure, generating chambers passing through said body adjacent the outer wall thereof, a plurality of perforated carbid containers in said chambers, and independent connections between the chambers and the lantern.

3. A buoy of the character described comprising a body, a central air tube passing therethrough and depending therebelow, a superstructure carried by the body, a lantern and a whistle in said superstructure, a connection between said air tube and whistle, means for preventing the entrance of water into said connection, a plurality of generating chambers passing through the body parallel with said air tube having conical lower portions, and independent means for conveying gas from each chamber to the lantern.

In witness whereof we have hereunto set our hands in the presence of two witnesses.

PETER C. JOHNSON.
JOSEPH A. LEGERE.

Witnesses:
HARRY S. HILL,
ALBERT G. EBERT.

Copies of this patent may be obtained for five cents each, by addressing the "Commissioner of Patents, Washington, D. C."